US010543770B2

(12) United States Patent
Grau et al.

(10) Patent No.: US 10,543,770 B2
(45) Date of Patent: Jan. 28, 2020

(54) RECEIVING DEVICE FOR BEVERAGE CONTAINERS

(71) Applicant: GENTHERM GMBH, Odelzhausen (DE)

(72) Inventors: Johannes Grau, München (DE); Thomas Johansen, Kirchseeon (DE); Sven Watzke, Augsburg (DE)

(73) Assignee: GENTHERM GMBH, Odelzhausen (DE)

(*) Notice: Subject to any disclaimer, the term of this patent is extended or adjusted under 35 U.S.C. 154(b) by 171 days.

(21) Appl. No.: 15/147,153

(22) Filed: May 5, 2016

(65) Prior Publication Data

US 2016/0325665 A1 Nov. 10, 2016

(30) Foreign Application Priority Data

May 6, 2015 (DE) ........................ 10 2015 005 681

(51) Int. Cl.
*B60N 3/10* (2006.01)
*F25B 21/04* (2006.01)
(Continued)

(52) U.S. Cl.
CPC .............. *B60N 3/104* (2013.01); *F25B 21/04* (2013.01); *F25B 2321/023* (2013.01)

(58) Field of Classification Search
CPC ......... B60N 3/104; B60N 3/101; F25B 21/04; F25B 2321/023; F25B 2321/0212; F25B 2700/2104; F25B 2321/0251
(Continued)

(56) References Cited

U.S. PATENT DOCUMENTS 2,046,125 A 7/1936 Lacy
3,432,641 A 3/1969 Welke
(Continued)

FOREIGN PATENT DOCUMENTS

CN 1342255 A 3/2002
CN 1552609 A 12/2004
(Continued)

OTHER PUBLICATIONS

Doi Atsushi (WO 2015041058 A1), Cup Holder, Mar. 2015, English translation, European Patent Office.*
(Continued)

*Primary Examiner* — Frantz F Jules
*Assistant Examiner* — Steve S Tanenbaum
(74) *Attorney, Agent, or Firm* — The Dobrusin Law Firm, P.C.

(57) ABSTRACT

A receiving device for beverage containers is disclosed. The receiving device comprises a supporting construction that is open at the top, which can receive the particular beverage container and consists at least of a first material. Furthermore, at least one heat-conducting element which can forward heat and/or cold to a beverage container received by the supporting construction. In addition, one or more thermoelectric air-conditioning units for generating heat and/or cold. The one or more thermoelectrical air-conditioning units have a thermally conductive contact with the at least one heat-conducting element. The at least one heat-conducting element consists of at least one second material which has an elevated thermal conductivity in comparison to the at least one first material.

18 Claims, 18 Drawing Sheets

10
18
18
12
14
30
32
E
16
19, 20

(51) Int. Cl.
*B65D 81/34* (2006.01)
*B65D 25/10* (2006.01)
*B65D 81/18* (2006.01)

(58) Field of Classification Search
USPC .............................................................. 62/3.6
See application file for complete search history.

(56) References Cited

U.S. PATENT DOCUMENTS

| | | | | |
|---|---|---|---|---|
| 4,095,090 | A | 7/1978 | Pianezza | |
| 4,463,664 | A | 8/1984 | Peace | |
| 4,801,782 | A | 1/1989 | Ineson | |
| 4,842,353 | A | 6/1989 | Thevenon | |
| 5,243,684 | A | 9/1993 | Edwards | |
| 5,279,489 | A * | 1/1994 | Wheelock | B60N 3/101 224/926 |
| 5,283,420 | A | 2/1994 | Montalto | |
| 5,508,494 | A | 4/1996 | Sarris et al. | |
| 5,720,171 | A * | 2/1998 | Osterhoff | A47J 36/2461 62/298 |
| 5,842,353 | A | 12/1998 | Kuo-Liang | |
| 5,990,456 | A | 11/1999 | Kilbride | |
| 6,013,901 | A | 1/2000 | Lavoie | |
| 6,075,229 | A | 6/2000 | Vanselow | |
| 6,082,114 | A | 7/2000 | Leonoff | |
| 6,119,461 | A | 9/2000 | Stevicl et al. | |
| 6,121,585 | A | 9/2000 | Dam | |
| 6,140,614 | A | 10/2000 | Padamsee | |
| 6,141,969 | A | 11/2000 | Launchbury et al. | |
| 6,463,743 | B1 * | 10/2002 | Laliberte | F25B 21/04 62/3.3 |
| 6,670,583 | B2 | 12/2003 | Kara | |
| 6,674,052 | B1 * | 1/2004 | Luo | A47J 41/0077 219/432 |
| 6,864,462 | B2 | 3/2005 | Sanoner et al. | |
| 6,870,135 | B2 | 3/2005 | Hamm et al. | |
| 7,804,045 | B2 | 9/2010 | Rosenbloom et al. | |
| 2002/0023912 | A1 | 2/2002 | McGee et al. | |
| 2002/0168496 | A1 | 11/2002 | Morimoto et al. | |
| 2002/0175158 | A1 | 11/2002 | Sanoner et al. | |
| 2004/0045973 | A1 | 3/2004 | Stokes | |
| 2005/0045615 | A1 | 3/2005 | Sanoner et al. | |
| 2005/0274121 | A1 * | 12/2005 | Sundhar | B67D 1/0869 62/3.64 |
| 2006/0185711 | A1 * | 8/2006 | Bang | F25B 21/02 136/230 |
| 2006/0186297 | A1 | 8/2006 | Lore | |
| 2007/0090256 | A1 | 4/2007 | Hansen et al. | |
| 2007/0204629 | A1 | 9/2007 | Lofy | |
| 2009/0038317 | A1 * | 2/2009 | Otey | F25B 21/04 62/3.2 |
| 2009/0288800 | A1 * | 11/2009 | Kang | B60N 2/793 165/42 |
| 2010/0089901 | A1 | 4/2010 | Montana | |
| 2011/0083446 | A1 * | 4/2011 | Pinet | F25B 21/02 62/3.6 |
| 2014/0130517 | A1 | 5/2014 | Oh et al. | |
| 2014/0352326 | A1 | 12/2014 | Oh et al. | |
| 2015/0362229 | A1 | 12/2015 | Oh et al. | |
| 2016/0107588 | A1 | 4/2016 | Ranalli et al. | |
| 2016/0167556 | A1 * | 6/2016 | Ji | B60N 3/108 224/539 |
| 2016/0236605 | A1 * | 8/2016 | Doi | B60N 3/104 |

FOREIGN PATENT DOCUMENTS

| | | | | |
|---|---|---|---|---|
| CN | 102320424 | A | 1/2012 | |
| DE | 202006009975 | U1 | 10/2007 | |
| DE | 102013103982 | A1 | 5/2014 | |
| DE | 102013110393 | A1 | 12/2014 | |
| DE | 102014115968 | A1 | 12/2015 | |
| JP | H01139011 | A | 5/1989 | |
| JP | H02193619 | A | 7/1990 | |
| JP | H05220784 | A | 8/1993 | |
| JP | 2001130646 | A | 5/2001 | |
| JP | 2001201233 | A | 7/2001 | |
| JP | 2001221550 | A | 8/2001 | |
| JP | 3088417 | U | 9/2002 | |
| JP | 2003304977 | A | 10/2003 | |
| JP | 2004195054 | A | 7/2004 | |
| JP | 2005058363 | A | 3/2005 | |
| JP | 2006071138 | A | 3/2006 | |
| JP | 2015058837 | A | 3/2015 | |
| JP | WO 2015041058 | A1 * | 3/2015 | B60N 3/104 |
| KR | 20050003558 | A | 1/2005 | |
| KR | 20140100182 | A | 8/2014 | |
| KR | 20150010539 | A | 1/2015 | |
| WO | 02/20292 | | 3/2002 | |
| WO | 2003/062720 | A2 | 7/2003 | |
| WO | 2004/059223 | | 7/2004 | |
| WO | 2007/089789 | | 8/2007 | |
| WO | 2015/041058 | A1 | 3/2015 | |

OTHER PUBLICATIONS

Peacock, Thomas, 2D Motion of Rigid Bodies: Rolling cylinder and Rocker Examples, Mar. 19, 2007.*
Potentially related U.S. Appl. No. 14/894,655, dated Jun. 6, 2014, published as 2016/0107558.
Chinese First Office Action for Chinese Application 201610638249.4; dated Feb. 22, 2018.
Japanese Decision to Grant for Japanese Application 2016-093429; dated Sep. 7, 2017.
Japanese Notice of Refusal for Japanese Application 2016-093429; dated Mar. 28, 2017.
Japanese Written Opinion for Japanese Application 2016-093429; dated Aug. 28, 2017.
Korean Notice of Final Rejection for Korean Application 10-2016-0055063; dated Apr. 4, 2018.
Korean Notice of Final Rejection for Korean Application 10-2016-0055063; dated Dec. 27, 2017.

* cited by examiner 24
19, 20
18
22
18
26
24
16
14
10

28
18
19, 20
16
18
14
10

12
19, 20
16
30
30
18
14

10

12
18
19, 20
30
18
16
14
10

RECEIVING DEVICE FOR BEVERAGE CONTAINERS

FIELD

The present teachings relate to a receiving device for beverage containers.

BACKGROUND

In order to store beverage containers or other objects to be tempered at a desired temperature many vehicles are equipped with receiving devices for beverage containers that can be air-conditioned. The receiving devices can heat and/or cool the beverage containers. Receiving devices for beverage containers in which the heat charge and/or heat removal is carried out by thermoelectric air-conditioning units (TED units) which can be placed on side areas or bottom areas of the receiving device. To this end the receiving device is completely manufactured from a usually expensive material with high thermal conductivity, for example aluminum or heat-conductive plastic. As a result heat and/or cold can be transferred by conduction, convection or radiation. A large-area, complete surrounding of the receiving device with homogeneously temperable areas of the receiving device is necessary in order to make the desired air-conditioning of the beverage container available. The receiving device is interrupted for stabilizing beverages in its area which can be air-conditioned only by holding elements. However, this procedure has the disadvantage that a large thermal mass must be heated or cooled. This extends the reaction time of the entire system. Furthermore, a high energy consumption is required in order to heat or cool the particular beverage container. For this reason the present invention has a problem of making a receiving device for beverage containers available which has a lower inertia when heating or cooling the particular beverage container. Furthermore, beverage containers should be able to be heated and cooled with less energy cost with the receiving device. In addition, the receiving device should be able to be manufactured simply and economically.

SUMMARY

The above problems are solved by a receiving device comprising the features: a receiving device for beverage containers, comprising: a supporting construction that is open at the top, which can receive the particular beverage container and consists at least of a first material, at least one heat-conducting element which can forward heat and/or cold to a beverage container received via the supporting construction, one or more thermoelectric air-conditioning units for generating heat and/or cold, wherein the one or more thermoelectric air-conditioning units have a thermally conductive contact with the at least one heat-conducting element, and wherein the at least one heat-conducting element is formed by at least one second material which has an elevated thermal conductivity in comparison to the at least one first material.

Advantageous embodiments are described by the subclaims. Therefore, the invention suggests for achieving the cited problem a receiving device for beverage containers that has a supporting construction that is open at the top, which can receive the particular beverage container and consists at least of a first material. The supporting construction can be designed in such a manner as regards its shape that the particular beverage container is held substantially immovably and preferably by positive locking and/or clamping by the supporting construction. In especially preferred embodiments the supporting construction can be constructed with plastic.

Furthermore, at least one heat-conducting element and at least one functional layer are provided that can forward heat and/or cold to a beverage container received in the supporting construction. The at least one heat-conducting element can have a contact surface with which a beverage container received in the supporting construction makes surface contact. The at least one heat-conducting element can therefore be positioned at least partially in a receiving space for the beverage container formed by the supporting construction or can extend into this space.

In addition, the receiving device comprises one or more thermoelectric air-conditioning units for generating heat and/or cold. The one or more thermoelectrical air-conditioning units have a thermally conductive contact with the at least one heat-conducting element, wherein the at least one heat-conducting element is formed by at least one second material which has an elevated thermal conductivity in comparison to the at least one first material. It is conceivable, for example, that the one or more thermoelectrical air-conditioning units are placed on the at least one heat-conducting element. In an especially preferred embodiment the one or more thermoelectrical air-conditioning units comprise at least one Peltier element.

In conceivable embodiments the at least one heat-conducting element and the supporting construction can be formed by plastic and in particular produced by a two-component injecting molding process. The at least one first material from which the supporting construction is built up can be an economical, stabilizing plastic material in order to create a load-bearing outer structure and to impart a certain stability to the receiving device. However, the use of other materials such as, for example metals, in particular aluminum, is also possible.

The surface of the supporting construction facing the beverage container can be covered at least in part by the material with an elevated thermal conductivity, by which the at least one heat-conducting element is formed. This construction reduces the thermal mass to be heated and therefore results in a shortened reaction time of the air-conditioning process. Alternatively, it is also conceivable that the receiving device is equipped only at selected areas with one or more heat-conducting elements. Since the receiving device is equipped in many instances with holding devices in order to stabilize the beverage container, in these areas optionally no direct transfer of heat to the particular beverage container can take place via the at least one heat-conducting element. Since the main transfer of heat optionally takes place at the contact surfaces, it is conceivable to place a heat-conductive material only at surfaces of the receiving device at which the beverage container makes contact with the receiving device. This reduces the thermal mass to be heated even more and shortens the reaction time of the air-conditioning process.

Since holding elements are attached on opposite sides of the receiving device, a thermal contact for the transfer of heat can optionally result only at a base surface of the receiving device. A heat-conducting element is ideally positioned in this area. If the holding elements are arranged in such a manner that contact surfaces are formed for the transfer of heat on a bottom surface as well as on an inner side surface of the receiving device, material with an elevated thermal conductivity can be attached in the area of the bottom surface and in the area of the inner side surface.

This procedure brings about a higher thermal charge at points since a higher heat flow is conducted over a smaller surface. In addition, the heat loss via the ambient air is reduced. In addition, production costs can be reduced by the lesser use of material with elevated thermal conductivity.

The one or more air-conditioning units for producing heat and/or cold can comprise one or more Peltier elements. In addition, the thermoelectrical air-conditioning unit can be localized underneath the supporting construction or on its side walls. The thermoelectrical air-conditioning unit can be set from the outside on the heat-conducting element, optionally adhered to the latter, fixed by a fastening device and/or fixed in a similar manner so that it makes a thermally conductive contact with the at least one heat-conducting element.

Furthermore, it can be provided that a determined area of the at least one heat-conducting element extends outward through a wall of the supporting construction. The supporting construction can form an opening in this area. Also, a flat cross section of the determined area can be constructed here that is enlarged in comparison to other areas of the at least one heat-conducting element. The one or more thermoelectrical air-conditioning units can be set from the outside onto the determined area of the at least one heat-conducting element.

Moreover, it is conceivable that the one or more thermoelectrical air-conditioning units are covered by at least one heat transfer device which at least one heat transfer device is fixed on the supporting construction by one or more fastening means and in particular by screw connections. Embodiments have proven themselves here in which the one or more fastening means are individually anchored in the supporting construction and do not reach the heat-conducting element.

In order to insulate the at least one heat-conducting element of the receiving device from the supporting construction the structure of the receiving device can be supplemented by a third or other components. Accordingly, an insulating intermediate layer can be located between the at least one heat-conducting element and the supporting construction. The at least one heat-conducting element, the supporting construction and the insulating intermediate layer can be produced, for example, by a three-component injection molding process. The insulating intermediate layer can partially cover and preferably completely cover the heat-conducting element on its side facing the supporting construction. Moreover, it is conceivable that the insulating intermediate layer is completely received by the supporting construction or is closed flush with the supporting construction.

Furthermore, it is conceivable that the insulating intermediate layer is introduced as a gas bubble between the at least one heat-conducting element and the supporting construction in order to be able to build up a thermal insulation in this manner. In this procedure a gas bubble is injected into the material layer of the supporting construction in such a manner that an insulating intermediate layer between the at least one sheet-conducting element and the supporting construction is produced inside the supporting construction. In addition, an insulating design of the material of the supporting construction is conceivable in order to thermally screen the at least one heat-conducting element against an environment. The structure of the material of the supporting construction can be enriched to this end with a filling of gas in order to obtain an insulating character of the supporting construction. The gas filling can be, for example, an injection of gas or of propellant.

For an improved transfer of heat and/or cold via a positive-locking, elastically resilient material with an elevated thermal conductivity such as gels or rubber can be used for the at least one heat-conducting element. Accordingly, the at least one heat-conducting element can have a reversibly elastic deformability so that a beverage container received by the supporting construction can be held under elastic deformation in a clamping manner by the at least one heat-conducting element. The beverage container can lie against the elastically resilient material and therefore enlarge the contact area for the charge of heat. Holding elements can be optionally eliminated here for stabilizing beverage containers since the beverage container is held in position, if necessary, by the elastically resilient material.

It is conceivable in the purposeful local positioning of the material with elevated thermal conductivity to integrate the material firmly into the supporting construction. This can be carried out, for example, by extrusion-coating the at least one heat-conducting element with the material of the supporting construction. The at least one heat-conducting element extrusion-coated in the supporting construction can be anchored by a holding structure. If the at least one heat-conducting element comprises one or more projections, that are completely extrusion-coating, then it can be ensured that the heat-conducting element is held firmly by the supporting construction. It is also possible to extrusion-coat the thermoelectrical air-conditioning unit with the material with elevated thermal conductivity with and/or the at least one heat-conducting element. This brings about a local reduction of the wall thickness of the at least one heat-conducting element and results in an improved transfer of heat and/or cold.

If the at least one heat-conducting element and the thermoelectrical air-conditioning unit are positioned with a short distance from one another an incorporation of both elements into the stabilizing material or the supporting construction is conceivable. The at least one heat-conducting element can also form a shoulder or an elevated surface here. This arrangement allows a better contacting or thermal transfer of heat between the thermoelectrical air-conditioning unit and the at least one heat-conducting element.

Furthermore, the receiving device or supporting construction can form at least two positions for receiving a beverage container. A separating wall can be interposed between the at least two positions which is formed at least in part by the at least one heat-conducting element and/or the supporting construction. In order to air-conditioning the two beverage containers each of the at least two positions can be associated with its own thermoelectrical air-conditioning element and/or its own heat-conducting element. As a result, any different amounts of heat and/or of cold can be passed on to the beverage containers of the at least two positions. A first position can be formed by the separating wall which position is formed for the positive-locking receiving of the first beverage container with a first maximum cross-sectional diameter and a second position which is formed for the form-locking receiving of the second beverage container with the second maximum cross-sectional diameter, whereby the second maximum cross-sectional diameter is enlarged or reduced relative to the first maximum cross-sectional diameter. Therefore, several beverage containers with different geometries and/or sizes can be received by one receiving device.

In order to make possible the fastening of the beverage container, for example, in the middle console of a vehicle, a fixing can be constructed on a lower side of the supporting construction which optionally comprises one or more fastening means. The one or more fastening means can optionally comprise one or more screw connections. The one or more screw connections can engage only in the supporting construction and not engage with the at least one heat-conducting element. This prevents the creation of undesired thermal bridges outside of the receiving device. As previously already mentioned, at least one heat transfer device can be provided which is fixed by the fastening means as a thermal and mechanical protection and/or for fastening the thermal air-conditioning device.

In addition, the at least one heat-conducting element and/or the supporting construction can be covered at least partially by a visible area. This can improve the optical impression of the receiving device by technical means.

In the following, exemplary embodiments explain the invention and its advantages in detail using the attached figures. The size ratios of the individual elements to each other in the figures do not always correspond to the real size ratios since a few forms are shown in a simplified manner and other forms are shown in an enlarged manner in comparison to other elements for the sake of better illustration.

DETAILED DESCRIPTION

Figure 1:
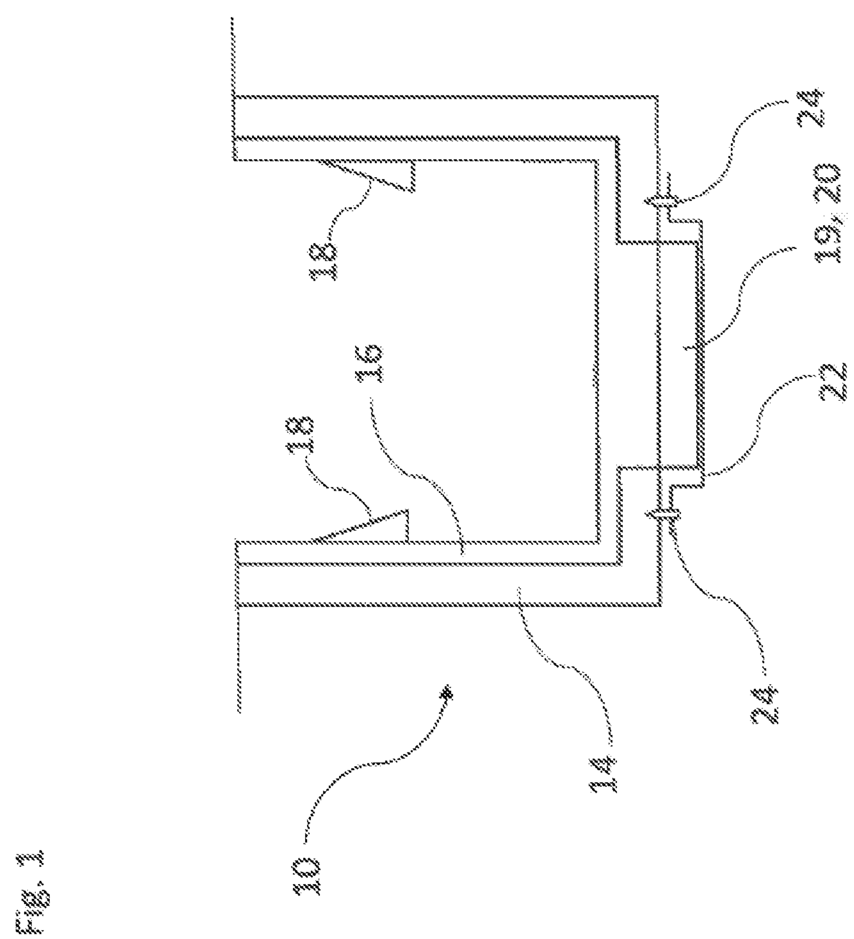
FIG. 1 shows a schematic section through an embodiment of a receiving device according to the invention.

Identical reference numerals are used for elements of the teachings herein that are the same or operate in the same manner. Furthermore, for the sake of clarity only reference numerals are shown in the individual figures which are required for the description of the particular figure. The exemplary embodiments shown represent only examples of how the device according to the invention can be designed and do not constitute any conclusive limitation.

Figure 6:
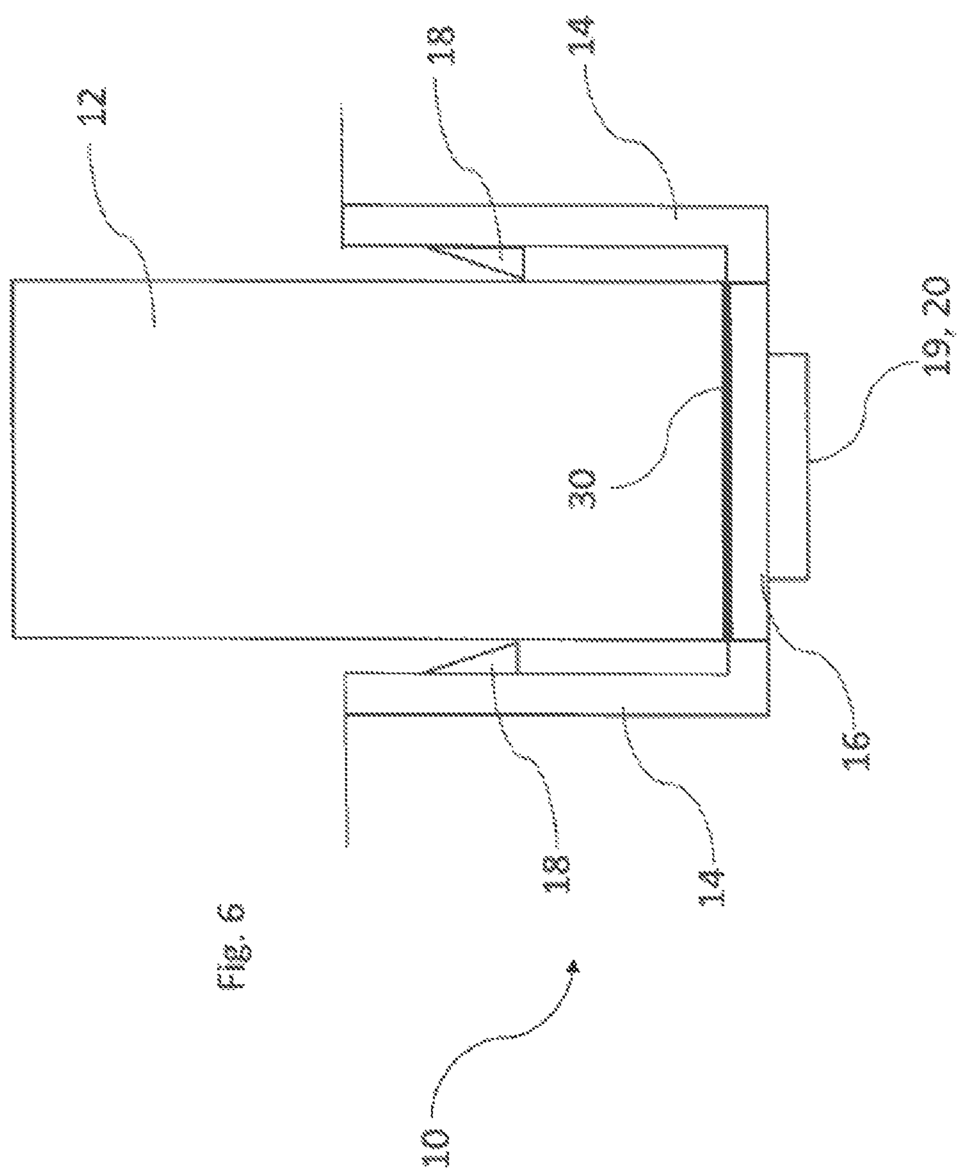
FIG. 6 shows a schematic section through another embodiment of a receiving device according to the invention.

FIG. 1 shows a schematic section or longitudinal section through an embodiment of a receiving device 10 according to the invention for beverage containers 12 (cf. FIG. 6). The receiving device 10 comprises a supporting construction 14 that is open at the top, can receive the particular beverage container 12 and is made of plastic. Furthermore, a heat-conducting element 16 can be recognized which can forward heat and/or cold to a beverage container 12 received via the supporting construction 14.

In order to produce heat and/or cold a thermoelectrical air-conditioning device 19 is provided constructed in the present instance as a Peltier element 20. The Peltier element 20 can be used for heating as well as for cooling the beverage container 12. In the exemplary embodiment of FIG. 1 the heat-conducting element 16 is arranged partially inside a receiving space for the beverage container 12 which is formed by the supporting construction 14. The supporting construction 14 forms an outer jacket surface of the receiving device 10. The sectional view according to FIG. 1 clearly shows that the supporting construction 14 is constructed with an opening on the bottom into which the heat-conducting element 16 engages. The cross-sectional surface of the heat-conducting element 16 is enlarged in the area of the opening in comparison to other areas, as a result of which a charging of heat or of cold generated by the thermoelectrical air-conditioning unit 19 can be effectively furthered in the direction of the beverage container 12.

The thermoelectrical air-conditioning unit 19 or the Peltier element 20 makes a thermally conductive contact with the heat-conducting element 16, wherein heat or cold is forwarded to the heat-conducting element 16 from the Peltier element 20 or from the thermoelectrical air-conditioning unit 19. In addition, the heat-conducting element 16 is constructed from a material that has an elevated thermal conductivity in comparison to the material of the supporting construction 14.

In addition, several holding elements 18 are provided with which a beverage container 12 received via the supporting construction 14 can be fixed in a clamping manner. If a beverage container 12 is inserted into the receiving device 10 or into the receiving space formed by the supporting construction 14, the holding elements 18 move back so that the beverage container 12 makes contact with a lateral outer jacket surface with the heat-conducting element 16 and can be tempered. For other embodiments it is also conceivable that the holding elements 18 are constructed to be at least largely rigid. Also, the particular beverage container 12 stands on the heat-conducting element 16 by its body area or its bottom surface so that direct heat or cold is forwarded from the heat-conducting element 16 to the bottom area of the beverage container 12.

In order to increase the heat exchange between the Peltier element 20 and its environment a heat transfer device 22 is provided. The heat transfer device 22 is anchored in the supporting construction 14 by fastening means 24 that can be formed, for example by screw connections. Furthermore, the receiving device 1 can be fixed via the fastening means 24 on a component of a motor vehicle, preferably on a central console, located in the passenger compartment. The heat transfer device 22 preferably increases the surface via which heat can be exchanged, e.g., by a rib structure not shown in detail. The heat transfer device 22 is preferably a heat-conducting sheet with corrugations and/or heat transfer ribs. This facilitates the removal of waste heat during the cooling operation and the supply of heat in the heating operation.

FIG. 1 shows here that the fastening means 24 or the screw connections do not extend into the heat-conducting element 16 and are therefore anchored only in the supporting construction 14. An undesired, direct transfer of heat from the heat-conducting element 16 to the fastening means 24 is suppressed in this manner, as a result of which the degree of effectiveness of the receiving device 10 can be increased when tempering a particular beverage container 12.

The heat-conducting element 16 consists, as well as the supporting construction 14, of a plastic material which, however, as already previously mentioned, has a higher thermal conductivity in comparison to the plastic material of the supporting construction 14. The supporting construction 14 and the heat-conducting element 16 can be manufactured together by a multi-component injection molding method. This includes methods with two, three or even more components.

Figure 2:
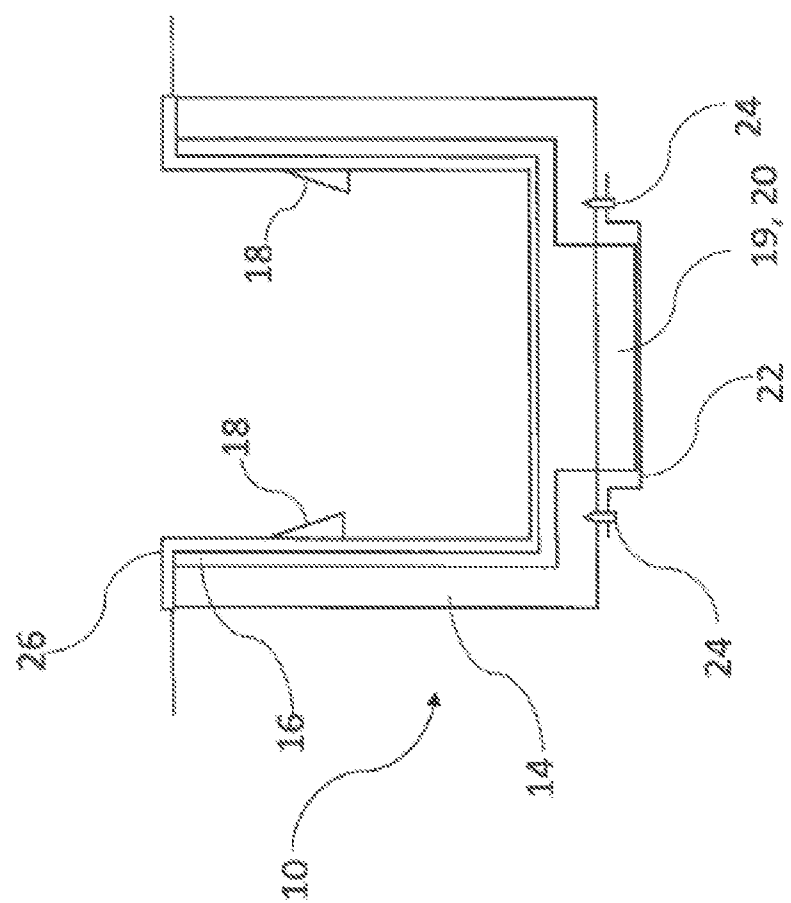
FIG. 2 shows a schematic section through another embodiment of a receiving device according to the invention.

FIG. 2 shows a schematic sectional view of another embodiment of the receiving device 10 according to the invention. Even the exemplary embodiment of the receiving device 10 from FIG. 2 comprises a supporting construction 14, a heat-conducting element 16 as well as a thermoelectrical air-conditioning unit 19 and a Peltier element 20. The material of which the heat-conducting element 16 is formed has a greater thermal conductivity in comparison to the material from which the supporting construction 14 is formed.

In addition to the receiving device 10 from FIG. 1 the receiving device 10 from the exemplary embodiment from FIG. 2 comprises a viewing area 26 which covers the heat-conducting element 16. Furthermore, the viewing area 26 covers the particular free end areas of the heat-conducting element 16 and of the supporting construction 14. Since the heat-conducting element 16 and the supporting construction 14 are formed from different materials and in the present instance from different plastics, this is associated with an inhomogeneous optical impression of the heat-conducting element 16 and of the supporting construction 14. Therefore an optimized optical impression of the receiving device 10 can be achieved through the visual area 26 via technical means. In a preferred embodiment the visual area 26 extends at least partially and preferably completely through a receiving space for the particular beverage container 12 which is formed via the supporting construction 14.

Figure 3:
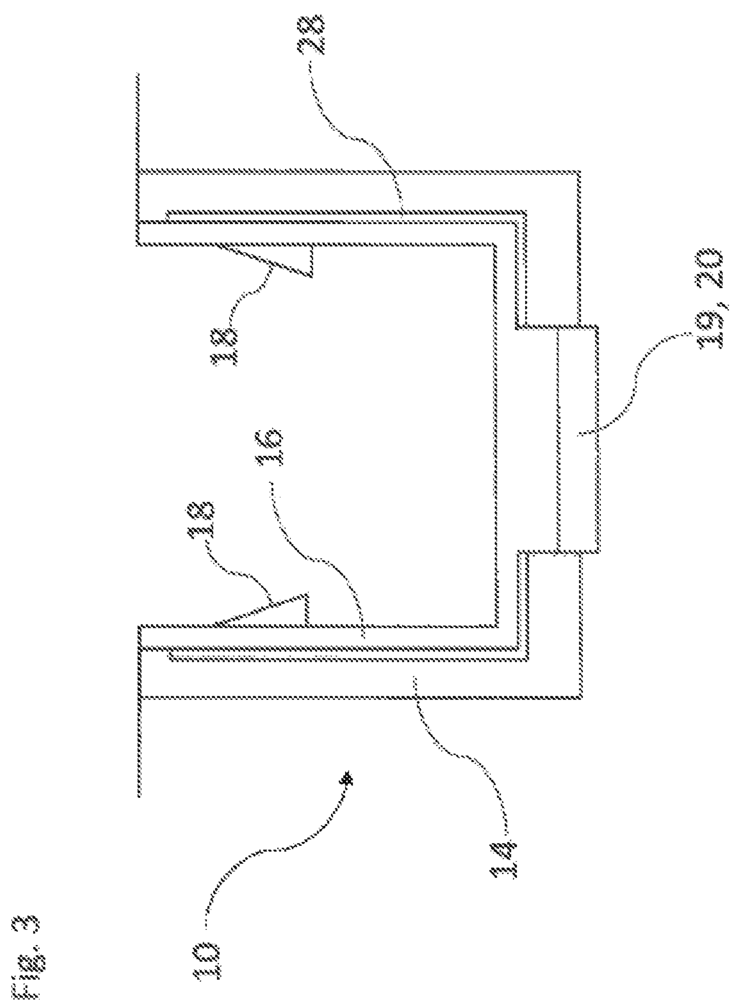
FIG. 3 shows a schematic section through another embodiment of a receiving device according to the invention.

FIG. 3 shows a schematic section through another embodiment of a receiving device 10 according to the invention. Even the exemplary embodiment of a receiving device 10 from FIG. 3 comprises a supporting construction 14, a heat-conducting element 16 and a thermoelectrical air-conditioning unit 19 and a Peltier element 20. The material from which the heat-conducting element 16 is formed has a greater thermal conductivity in comparison to the material from which the supporting construction 14 is formed.

In the exemplary embodiment of FIG. 3 an insulating intermediate layer 28 is present between the heat-conducting element 16 and the supporting construction 14. The insulating intermediate layer 28 can be constructed, for example, as a foamed material. Furthermore, the insulating intermediate layer 28 and the supporting construction 14 can be oriented toward one another in a flush manner, as is also shown in FIG. 3, so that the heat-conducting element 16 can make a flat contact with the insulating intermediate layer 28 and the supporting construction 14.

Figure 4:
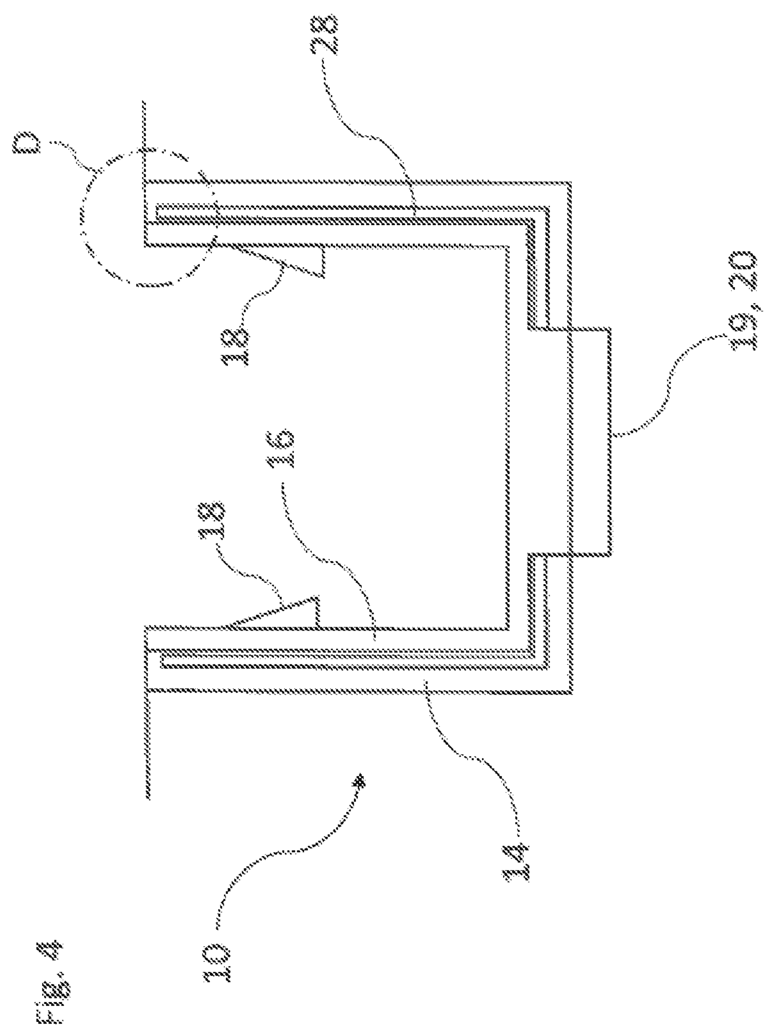
FIG. 4 shows a schematic section through another embodiment of a receiving device according to the invention.

FIG. 4 shows a schematic section through another embodiment of a receiving device 10 according to the invention. Even the exemplary embodiment of a receiving device 10 from FIG. 4 comprises a supporting construction 14, a heat-conducting element 16 and a thermoelectrical air-conditioning unit 19 and a Peltier element 20. The material from which the heat-conducting element 16 is formed has a greater thermal conductivity in comparison to the material from which the supporting construction 14 is formed.

Figure 5:
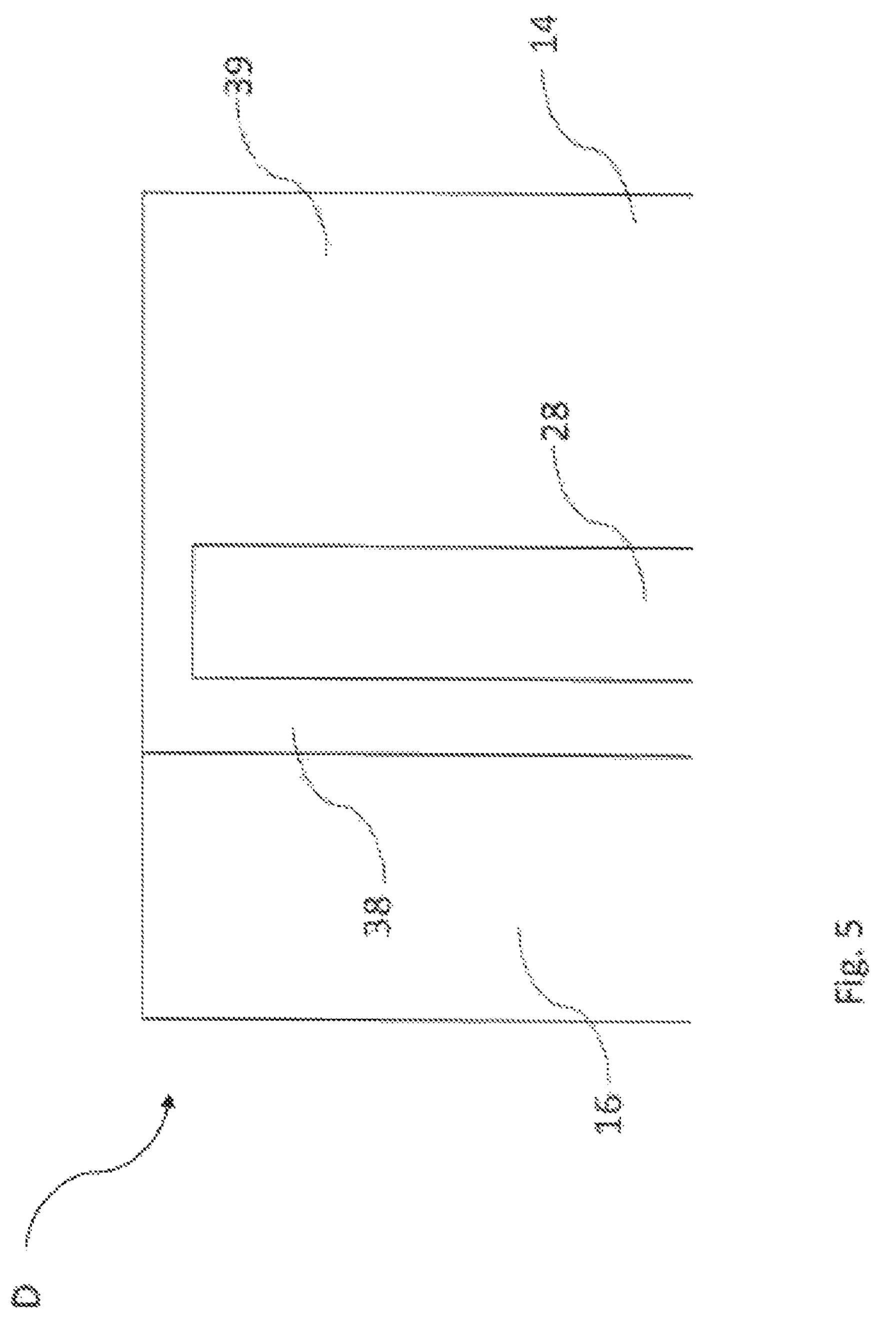
FIG. 5 shows a detailed cutout D of the embodiment from FIG. 4.

As in the exemplary embodiment of FIG. 3, an insulating intermediate layer 28 is provided. FIG. 5 shows the detailed section D of the embodiment of FIG. 4. A comparison of the FIGS. 4 and 5 illustrates the arrangement and the function of the insulating intermediate layer 28. Therefore, the insulating intermediate layer 28 is embedded in the supporting construction 14 and is completely received by the supporting construction 14. Furthermore, the insulating intermediate layer 28 divides the supporting construction 14 into an inner area 38 and an outer area 39. The inner area 38 is located closer to a beverage container 12 optionally received by the supporting construction 14. Opposite the outer area 39 the inner area 38 has a smaller cross-sectional area. The intermediate layer 28 can also be formed by a gas-filled hollow space or a vacuum.

For purposes of insulation the supporting construction 14 can also be enriched with a gaseous filling in order to act in an insulating manner. Here the incorporation of an insulating intermediate layer 28 is then no longer obligatorily necessary but can nevertheless be provided in various embodiments.

FIG. 6 shows a schematic section through another embodiment of a receiving device 10 according to the invention. Even the exemplary embodiment of a receiving device 10 from FIG. 6 comprises a supporting construction 14, a heat-conducting electromotor 16 and a thermoelectrical air-conditioning unit 19 and a Peltier element 20. The material from which the heat-conducting element 16 is formed has a greater thermal conductivity in comparison to the material from which the supporting construction 14 is formed.

The heat-conducting element 16 forms a contact surface 30 on an upper side or on its side facing the beverage container 12 on which side the beverage container 12 stands.

The flat dimension of the contact surface 30 preferably corresponds substantially to a bottom standing surface of the beverage container 12. The beverage container 12 preferably therefore does not project laterally over the contact surface 30. In addition, the contact surface 30 does not extend laterally past the beverage container 12. The heat-conducting element 16 is preferably at least as large as the bottom of the beverage container 12, preferably at least as large as the entire bottom of the receiving device 10 so that the beverage container 12 does not have any or very little mechanical thermal contact with the supporting construction 14. As a result, thermal losses can be produced.

The holding elements 18 serve in the exemplary embodiment of FIG. 6 for the alignment of the beverage container 12. Therefore, a position for the beverage container 12 is given by the holding elements 18 in such a manner that the beverage container 12 stands exactly with a bottom surface on the contact surface 30.

Figure 7:
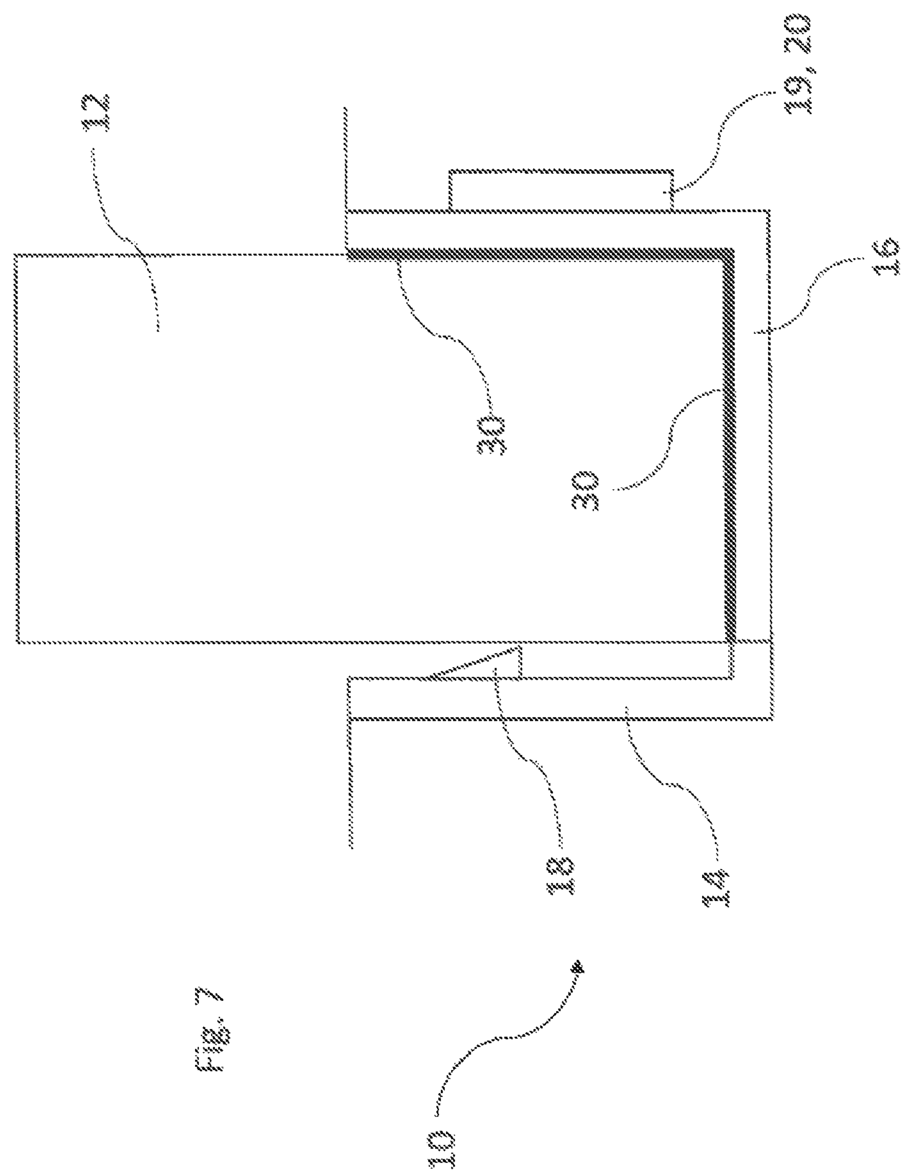
FIG. 7 shows a section through another embodiment of a receiving device according to the invention.

FIG. 7 shows a section through another embodiment of a receiving device 10 according to the invention. The heat-conducting element 16 forms a horizontally oriented contact surface 30 for the beverage container 12 and a vertically oriented contact surface 30 for the beverage container 12. The contact surfaces 30 of the heat-conducting element 16 are constructed in such a manner that they can rest on a bottom surface of the beverage container 12 as well as on a side jacket surface of the beverage container 12.

A production of heat and cold furthermore takes place via the thermoelectrical air-conditioning unit 19 and the Peltier element 20, which is set on the heat-conducting element 16. In the embodiment according to FIG. 7 the thermoelectric air-conditioning unit 19 and the Peltier element 20 are arranged on the side of the receiving device 10 and on the heat-conducting element 16.

Figure 8:
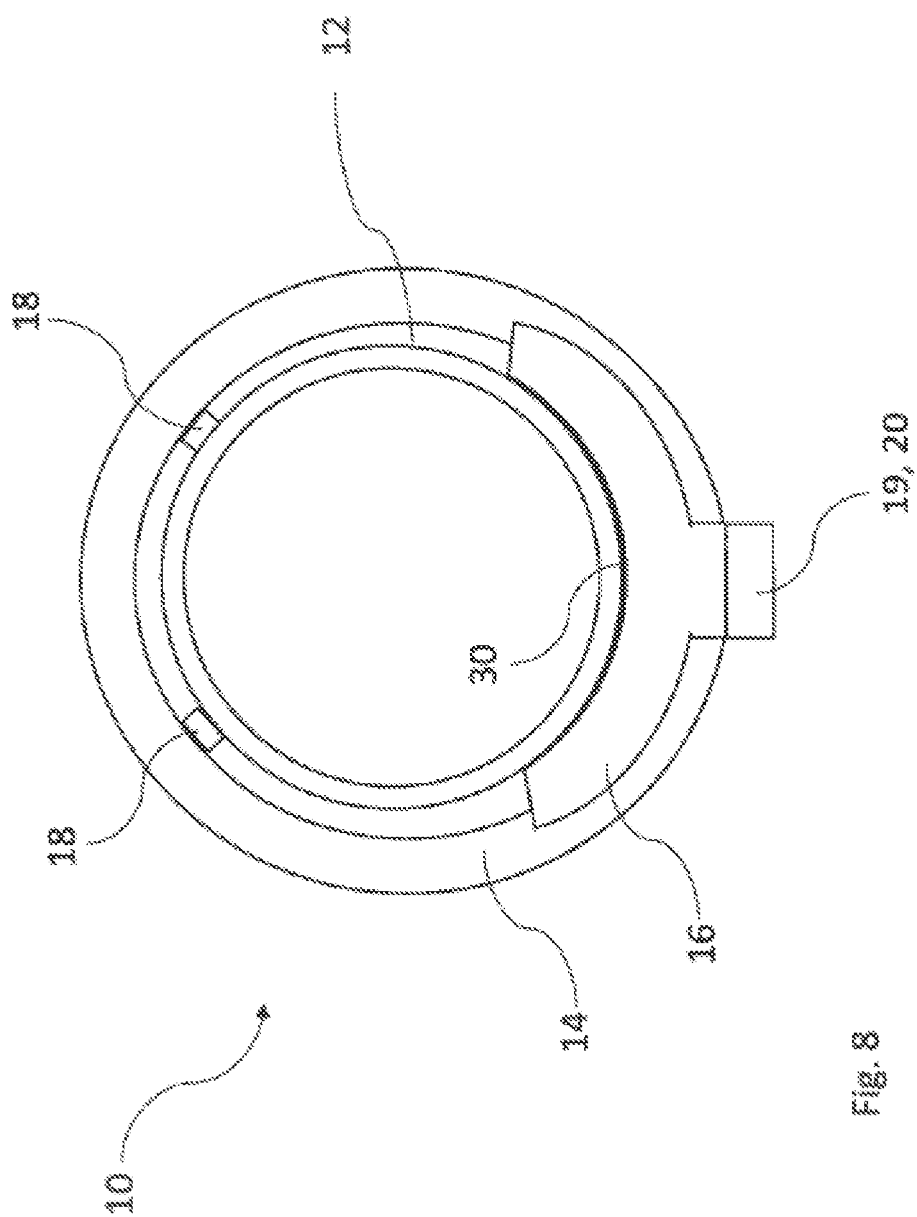
FIG. 8 shows a schematic section through another embodiment of a receiving device according to the invention.

FIG. 8 shows a section through another embodiment of a receiving device 10 according to the invention. The exemplary embodiment of a receiving device 10 from FIG. 8 also comprises a supporting construction 14, a heat-conducting element 16 and a thermoelectrical air-conditioning unit 19 and a Peltier element 20. The material from which the heat-conducting element 16 is formed has a greater thermal conductivity in comparison to the material from which the supporting construction 14 is formed, a greater thermal conductivity. Furthermore, the heat-conducting element 16 lies via a contact surface 30 on an outer jacket surface of the beverage container 12.

In the exemplary embodiment of FIG. 8 the heat-conducting element 16 can be reversibly elastically deformed and has a greater elastic flexibility in comparison to the supporting construction 14. When receiving a beverage container 12 by the supporting construction 14 the beverage container 12 comes to make contact with the contact surface 30 of the heat-conducting element 16, wherein the heat-conducting element 16 is elastically deformed. The holding elements 18 place the beverage container 12 firmly here on the heat-conducting element 16 in a force-loaded manner so that the beverage container 12 is held in the receiving device 10. The elastic deformability of the heat-conducting 16 increases the contact surface between the heat-conducting 16 and the beverage container 12. That increases the surface via which heat can be exchanged and therefore increases the efficiency of the tempering.

Figure 9:
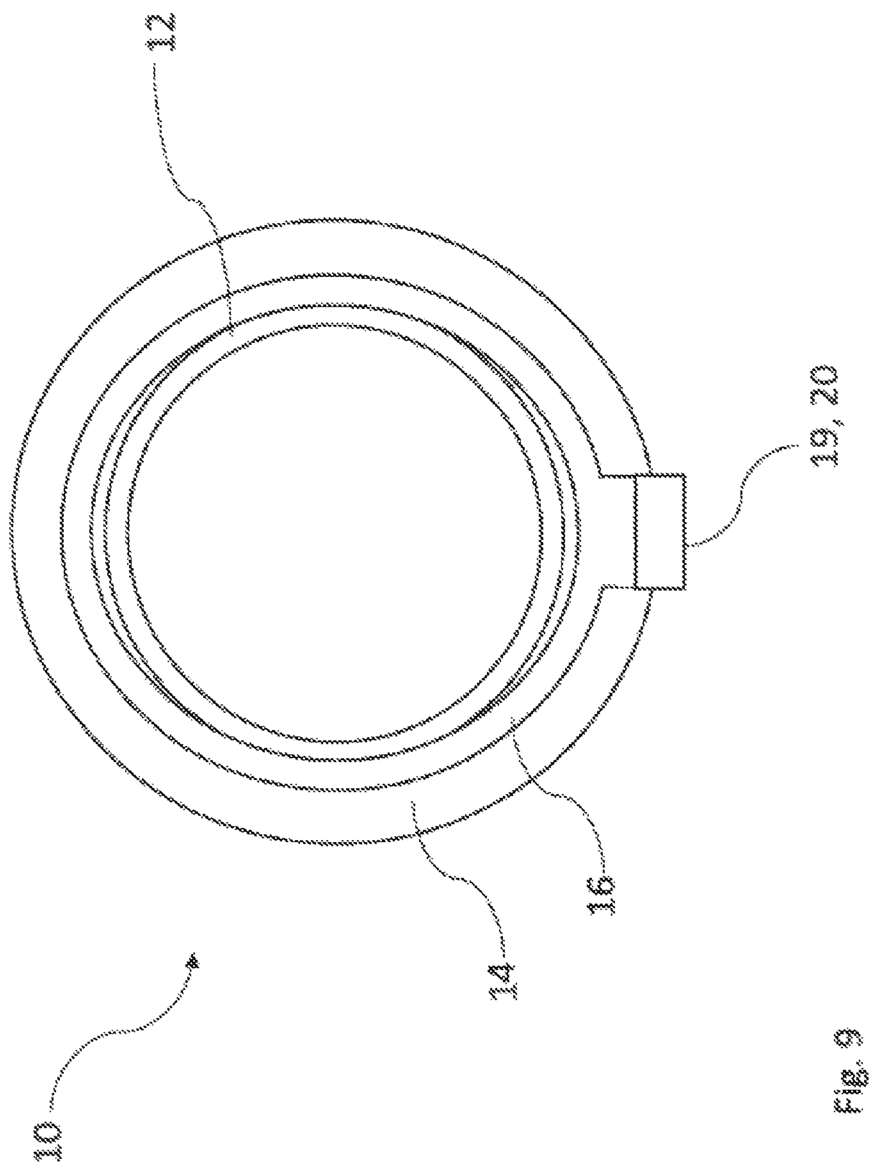
FIG. 9 shows a schematic section through another embodiment of a receiving device according to the invention.

FIG. 9 shows a schematic section through another embodiment of the receiving device 10 according to the invention. The heat-conducting element 16 of the exemplary embodiment from FIG. 9 is also reversibly elastically deformed during the receiving of a beverage container 12 so that the particular beverage container 12 is held clamped by the heat-conducting element 16 on the receiving device 10. Holding elements 18 according to previous embodiments are not provided in the exemplary embodiment of FIG. 9. It can be advantageous in order to optimally adapt to beverage containers 12 of different types if the heat-conducting element 16 and/or the receiving opening of the receiving device 10 have an elliptical opening shape. It can also be provided that the receiving opening is circular and the opening of the heat-conducting element 16 is elliptical or vice versa. This makes possible the greatest possible contact surfaces and a good mechanical support even for non-round beverage containers 12 because the elastic the formation of the heat-conducting element 16 produces a great contact surface between heat-conducting element 16 and the beverage container 12. As a result, the beverage container 12 is preferably clamped in a positive and non-positive manner at the same time so that it is secured against unintended shifting due to movements of the vehicle.

Figure 10:
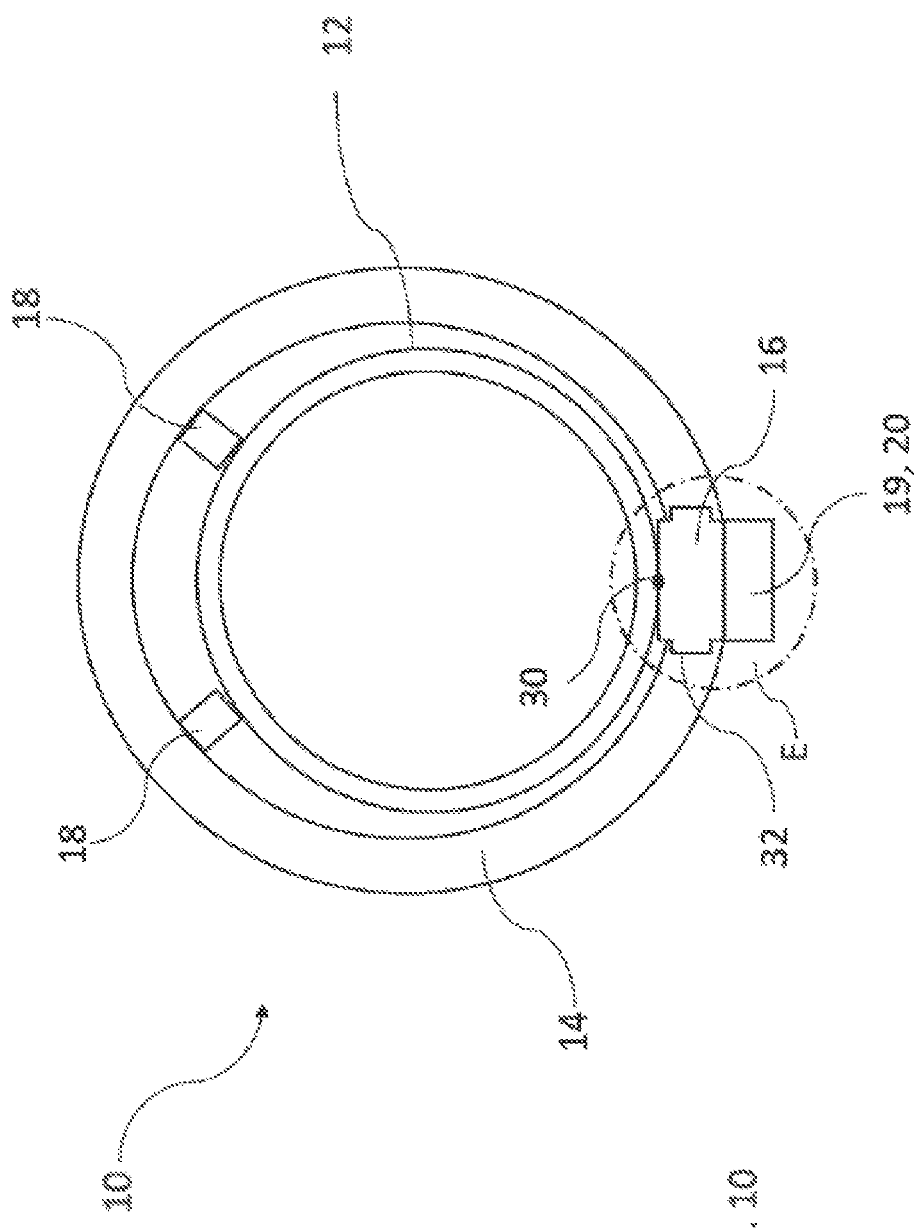
FIG. 10 shows a schematic section through another embodiment of a receiving device according to the invention.

FIG. 10 shows a schematic section through another embodiment of the receiving device 10 according to the invention. The heat-conducting element 16, which is constructed by aluminum here, can be recognized. The supporting construction 14 is constructed from plastic. The heat-conducting element 16 constructed by aluminum is extrusion-coated by the supporting construction 16 constructed by plastic so that the heat-conducting element 16 is positively received by the supporting construction 14. Furthermore, the beverage container 12 makes contact with the heat-conducting element 16 and is fixed by a contacting clamping by the holding elements 18. Heat and cold are forwarded by the thermoelectrical air-conditioning unit 19 and the Peltier element 20 to the heat-conducting element 16.

Figure 11:
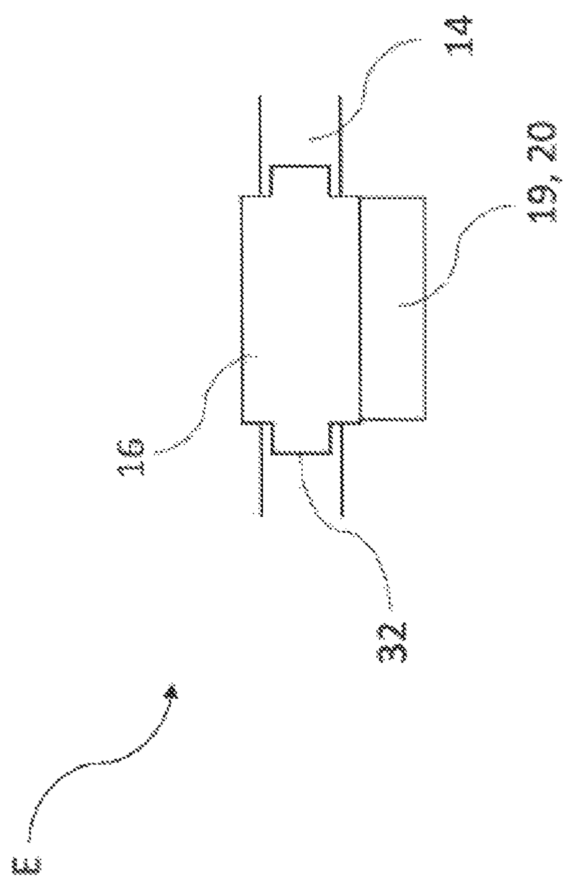
FIG. 11 shows the cutout E from FIG. 10 in detail.

FIG. 11 shows a detailed view of the cutout E from FIG. 10. The heat-conducting element 16 constructed from aluminum comprises a holding structure 32 and two holding noses formed on opposing sides by which the heat-conducting element 16 is positively fixed by the supporting construction 14.

Figure 12:
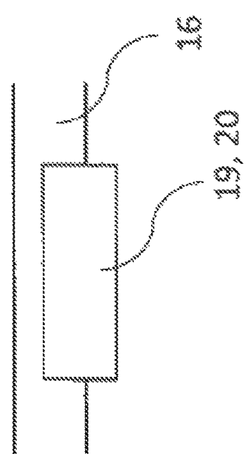
FIG. 12 illustrates a possible connection between a thermoelectrical air-conditioning unit and a heat-conducting element such as can be provided for various embodiments of a receiving device according to the invention.

FIG. 12 illustrates a possible connection between a thermoelectrical air-conditioning unit 19 and a heat-conducting element 16 such as can be provided for various exemplary embodiments of a receiving device according to the invention. The heat-conducting element 16 is made of plastic here and the thermoelectrical air-conditioning unit 19 is extrusion-coated by the heat-conducting element 16. This makes available in a very simple manner a thermally conductive connection between the heat-conducting element 16 and the thermoelectrical air-conditioning unit 19 and the Peltier element 20, in which the thermoelectrical air-conditioning unit 19 and the Peltier element 20 have a mechanically firm connection with the heat-conducting element 16.

Figure 13:
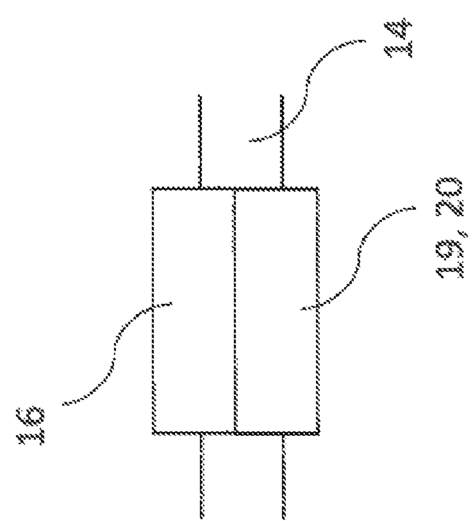
FIG. 13 illustrates another possible connection between a thermoelectrical air-conditioning unit and a heat-conducting element such as can be provided for various embodiments of a receiving device according to the invention.

FIG. 13 illustrates another possible connection between a thermoelectrical air-conditioning unit 19 and a heat-conducting element 16 such as can be provided for various embodiments of the receiving device 10 according to the invention. The heat-conducting element 16 is constructed by aluminum.

The thermoelectrical air-conditioning unit 19 as well as the heat-conducting element 16 are extrusion-coated by the supporting construction 14, which is constructed from plastic, and therefore mechanically coupled to the supporting construction 14. Practice has shown that in the case of such embodiments heat can be efficiently furthered from the thermoelectrical air-conditioning unit 19 and from the Peltier element 20 to the heat-conducting element 16.

Figure 14:
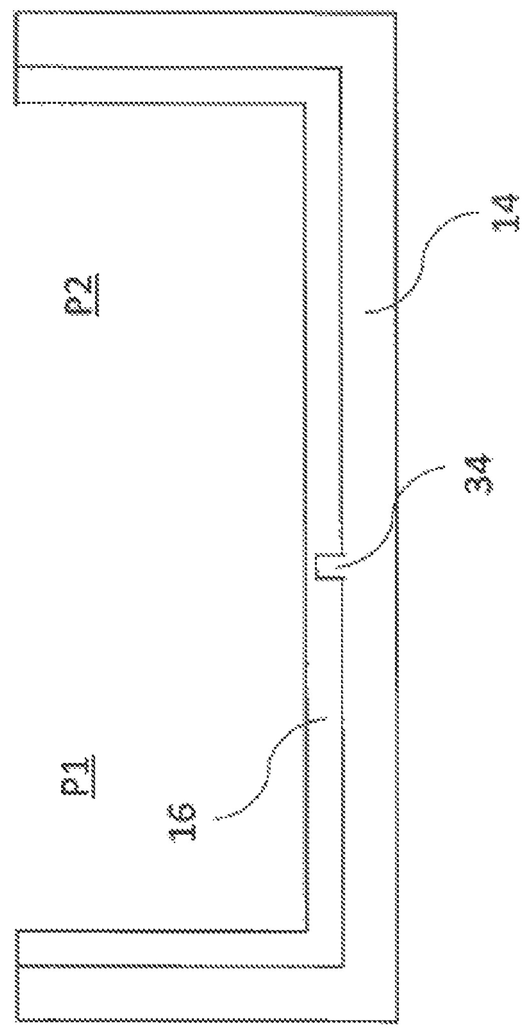
FIG. 14 shows a heat-conducting element and a supporting construction like those that can be constructed in various embodiments of a receiving device according to the invention.

FIG. 14 shows a heat-conducting element 16 and the supporting construction 14 such as can be constructed for various embodiments of the receiving device 10 according to the invention. The supporting construction 14 forms two receiving positions P1 and P2 for a beverage container 12. The first receiving position P1 is provided for receiving beverage containers 12 with a first maximum cross-sectional diameter and the second receiving position P2 is provided for receiving beverage containers 12 with a second maximum cross-sectional diameter. The latter is preferably constructed to be greater in comparison to the first maximum cross-sectional diameter. However, it can also have the same or a smaller size.

Furthermore, heat and cold is given off via the heat-conducting element 16 to the beverage containers 12 set in the receiving positions P1 and P2. In order to reduce an exchange of thermal energy between the two receiving positions P1 and P2 a heat brake 34 is provided here. The heat brake 34 is formed by the supporting construction 14, wherein the supporting construction 14 extends by a defined amount into the heat-conducting element 16 for forming the heat brake 34.

Figure 15:
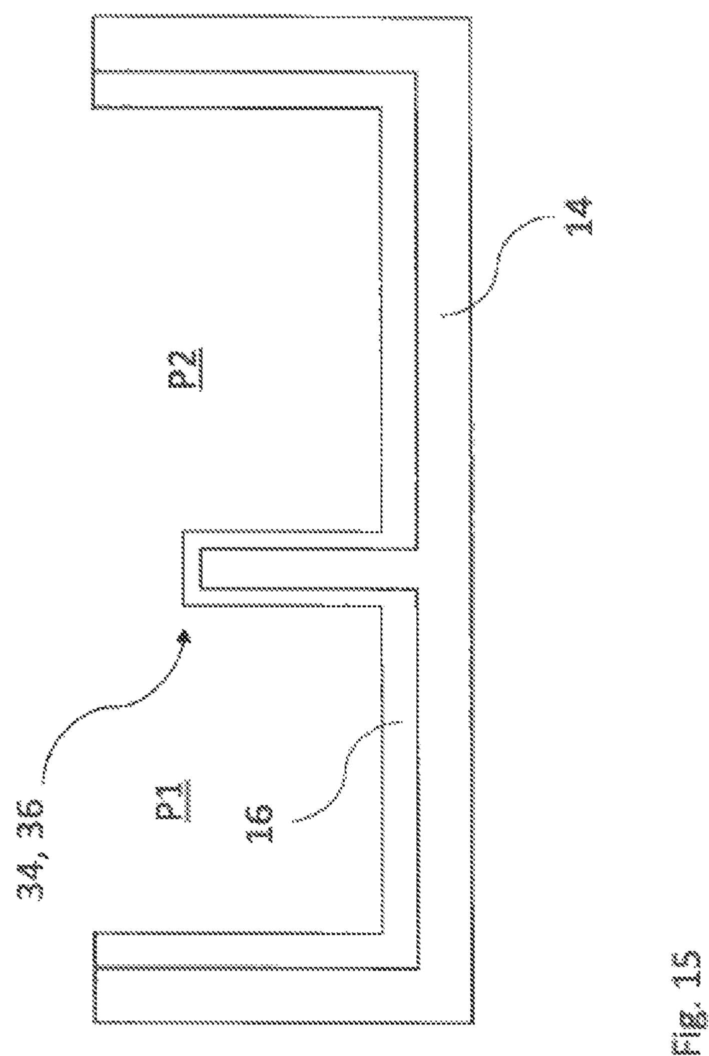
FIG. 15 shows a heat-conducting element and a supporting construction like those that can be constructed in various embodiments of a receiving device according to the invention.

FIG. 15 shows a heat-conducting element 16 and a supporting construction 14 such as can be constructed for various embodiments of the receiving device 10 according to the invention. The embodiment according to FIG. 15 comprises a separating wall 36 which mechanically separates the first receiving position P1 and the second position P2 from one another and which are each constructed according to the exemplary embodiment in FIG. 14 for receiving a beverage container 12. Furthermore, the separating wall 36 is constructed as a heat brake 34 in order to reduce a change or exchange of thermal energy between the two receiving positions P1 and P2. To this end the supporting construction 14 extends by a defined amount in a vertical direction upward and between the two receiving positions P1 and P2. FIG. 15 also shows that the cross-section surface of the heat-conducting element 16 via which heat and cold are forwarded to the particular beverage container 12 is reduced in area in the area of the separating wall 36.

Figure 16:
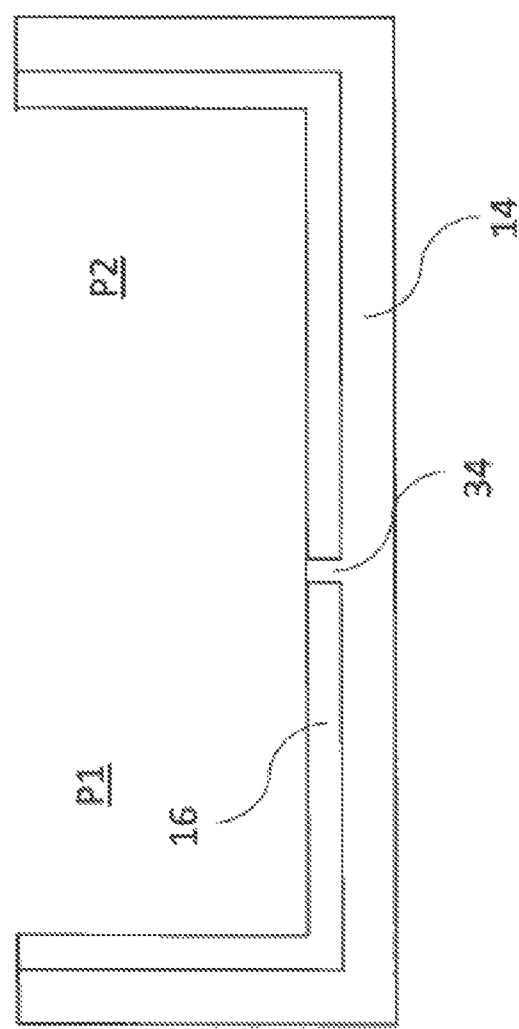
FIG. 16 shows a heat-conducting element and a supporting construction like those that can be constructed in various embodiments of a receiving device according to the invention.

FIG. 16 shows a heat-conducting element 16 and a supporting construction 14 such as can be constructed for various embodiments of the receiving device 10 according to the invention.

A comparison of the FIGS. 14 and 16 shows that the supporting construction 14 extends in FIG. 14 only by a certain amount into the heat-conducting element 16, wherein the supporting construction 14 in the exemplary embodiment in FIG. 16 completely interrupts the course of the heat-conducting element 16. The heating brake 34, which is therefore also constructed via the supporting construction 14 in the exemplary embodiment in FIG. 16 furthermore serves to reduce the heat transfer between the two receiving positions P1 and P2.

Figure 17:
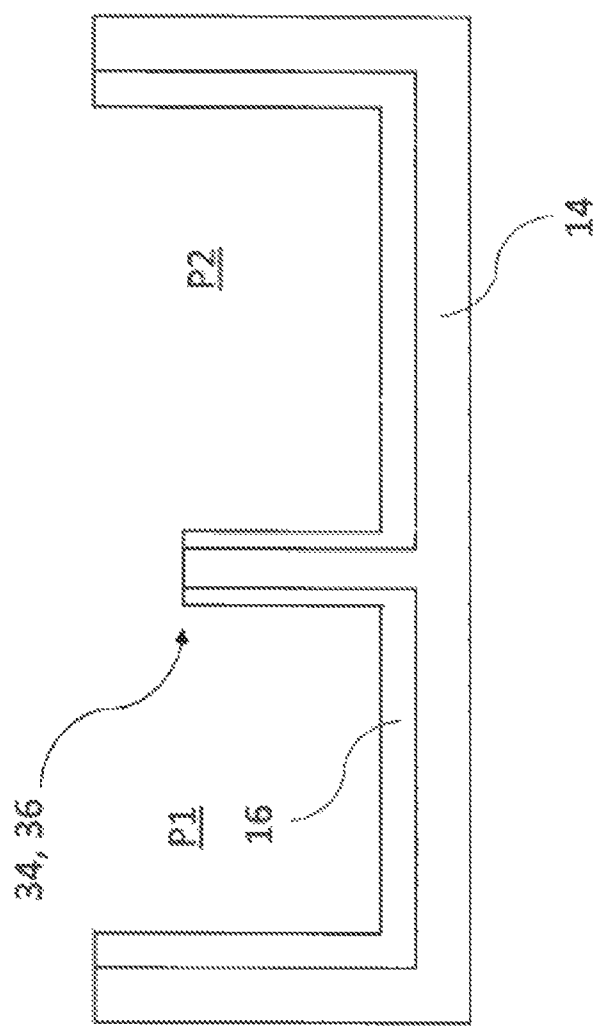
FIG. 17 shows a heat-conducting element and a supporting construction like those that can be constructed in various embodiments of a receiving device according to the invention.

FIG. 17 shows a heat-conducting element 16 and a supporting construction 14 such as can be constructed for various embodiments of the receiving device 10 according to the invention. A separating wall 36 is provided which limits the receiving position P1 opposite the receiving position P2.

The supporting construction 14 and the heat brake 34 constructed via the supporting construction 14 interrupts the course of the heat-conducting element 16. In the exemplary embodiment of FIG. 17 a heat transfer between the two receiving positions P1 and P2 is further reduced in comparison to the exemplary embodiment in FIG. 15.

Figure 18:
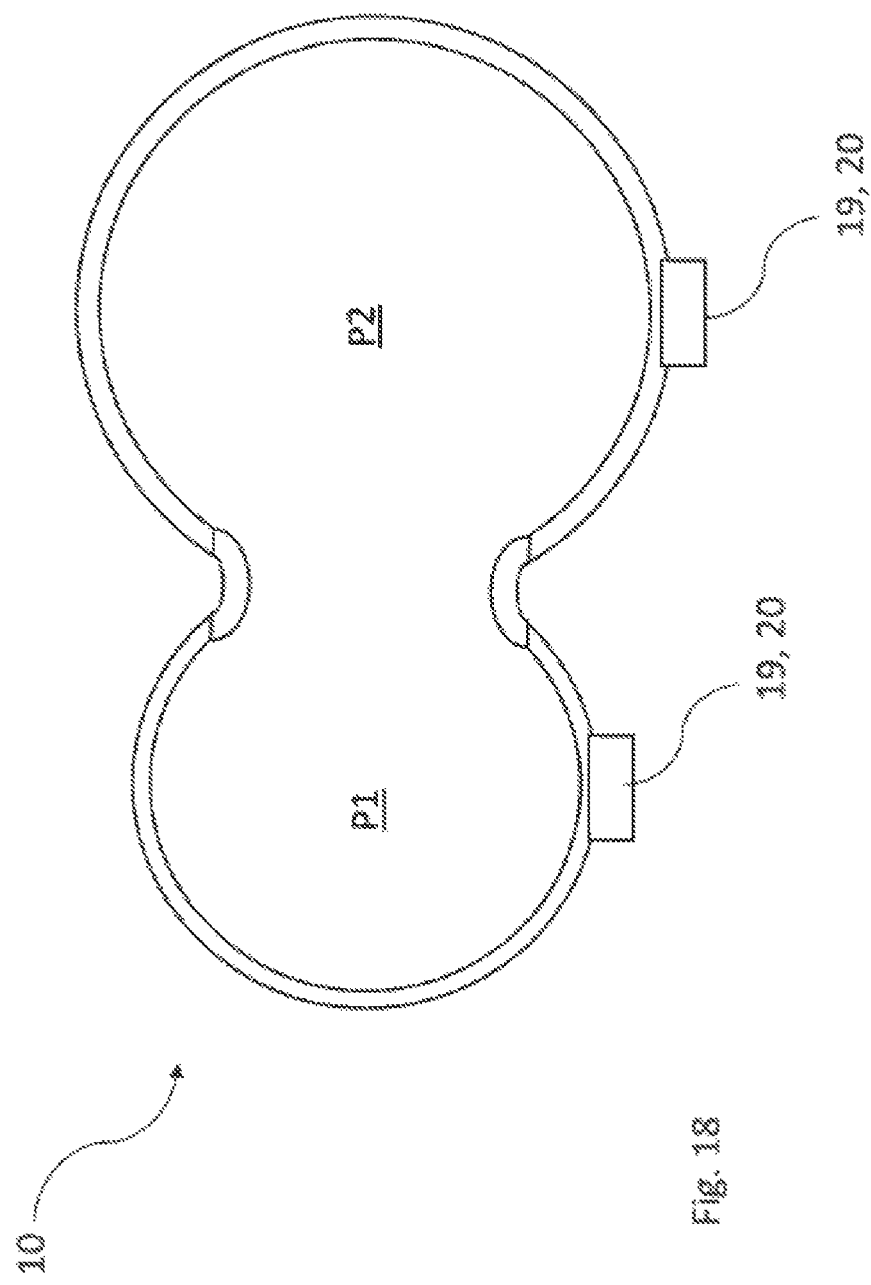
FIG. 18 shows a heat-conducting element and two thermoelectrical air-conditioning units like those that can be present in various embodiments of a receiving device according to the invention.

FIG. 18 shows a heat-conducting element 16 and two thermoelectrical air-conditioning units 19 such as can be constructed for various embodiments of the receiving device 10 according to the invention. The two thermoelectrical air-conditioning units 19 are constructed as Peltier elements 20. Each receiving position P1 and P2 is associated with its own thermoelectrical air-conditioning unit 19 and its own Peltier element 20 so that heat and cold can be supplied separately to the receiving positions P1 and P2 via its particular air-conditioning unit 19 and its particular Peltier element 20. The thermoelectrical air-conditioning units 19 can be connected for the separate tempering of the two receiving positions P1 and P2 to a control unit not shown in the figures of the present patent application.

The invention was described with reference made to a preferred embodiment. However, it is conceivable for a person skilled in the art that modifications or changes can be made to the invention without leaving the protective scope of the following claims.

LIST OF REFERENCE NUMERALS

10 receiving device
12 beverage container
14 supporting construction
16 heat-conducting element
18 holding element
19 thermoelectrical air-conditioning unit
20 Peltier element
22 heat transfer device
24 fastening means
26 visual surface
28 insulating intermediate layer
30 contact surface
32 holding structure
34 heat brake
36 separating wall
38 inner area
39 outer area
P1 receiving position
P2 receiving position

The invention claimed is:

1. A receiving device for beverage containers, comprising:

a supporting construction that is open at a top, which can receive a particular beverage container and consists at least of a first material, at least one heat-conducting element which can forward heat, cold, or both to the particular beverage container received via the supporting construction, holding elements, which bias the particular beverage container against the at least one heat-conducting element, one or more thermoelectric air-conditioning units for generating heat, cold, or both, wherein the one or more thermoelectric air-conditioning units have a thermally conductive contact with the at least one heat-conducting element, wherein the at least one heat-conducting element is formed by at least one second material which has an elevated thermal conductivity in comparison to the first material, wherein the at least one heat-conducting element forms a direct tangential contact with the particular beverage container, wherein the at least one heat-conducting element is fixed in the supporting construction by a holding structure, wherein the holding structure is two holding noses, protruding from the at least one heat-conducting element, formed on opposing sides of the at least one heat-conducting element, by which the at least one heat-conducting element is positively fixed by the supporting construction, wherein the supporting construction surrounds the two holding noses on two opposing sides of the two holding noses, whereby movement, in any direction, of the at least one heat-conducting element relative to the supporting construction is precluded.

2. The receiving device according to claim 1, wherein the one or more thermoelectric air-conditioning units are set on the at least one heat-conducting element.

3. The receiving device according to claim 1, wherein the at least one heat-conducting element and/or the supporting construction is covered at least partially by a visible area.

4. The receiving device according to claim 1, in which the at least one heat-conducting element, the supporting construction, or both are constructed with aluminum and/or plastic.

5. The receiving device according to claim 1, in which the supporting construction and the at least one heat-conducting element are manufactured by a two-component injection molding method.

6. A receiving device for beverage containers, comprising:

a supporting construction that is open at a top, which can receive a particular beverage container and consists at least of a first material, at least one heat-conducting element which can forward heat, cold, or both to the particular beverage container received via the supporting construction, one or more thermoelectric air-conditioning units for generating heat, cold, or both, wherein the one or more thermoelectric air-conditioning units have a thermally conductive contact with the at least one heat-conducting element, wherein the at least one heat-conducting element is formed by at least one second material which has an elevated thermal conductivity in comparison to the first material, wherein the one or more thermoelectric air-conditioning units are covered by at least one heat transfer device and the at least one heat transfer device is directly fastened to the supporting construction by one or more fastening means, wherein the one or more fastening means are individually anchored in the supporting construction and do not reach the at least one heat-conducting element, wherein the at least one heat-conducting element is fixed in the supporting construction by a holding structure, wherein the holding structure is two holding noses, protruding from the at least one heat-conducting element, formed on opposing sides of the at least one heat-conducting element, by which the at least one heat-conducting element is positively fixed by the supporting construction, wherein the supporting construction completely surrounds the two holding noses, whereby movement, in any direction, of the at least one heat-conducting element relative to the supporting construction is precluded.

7. The receiving device according to claim 1, wherein the direct tangential contact is between a flat wall of the at least one heat-conducting element and a circular wall of the particular beverage container.

8. The receiving device according to claim 1, wherein the at least one heat-conducting element is extrusion coated by the supporting construction.

9. The receiving device according to claim 6, wherein the receiving device comprises exactly two holding elements, a center point is defined between the exactly two holding elements, and the at least one heat-conducting element is positioned diametrically opposite the center point.

10. The receiving device according to claim 1, wherein a determined area of the at least one heat-conducting element extends through a wall of the supporting construction.

11. The receiving device according to claim 10, wherein a flat cross section of the determined area of the at least one heat-conducting element is enlarged in comparison to other areas of the at least one heat-conducting element.

12. The receiving device according to claim 1, wherein the two holding noses are completely surrounded by the supporting construction.

13. The receiving device according to claim 12, wherein the at least one heat-conducting element is extrusion coated by the supporting construction.

14. The receiving device according to claim 13, wherein the one or more thermoelectric air-conditioning units is/are extrusion coated by the supporting construction.

15. The receiving device according to claim 1, wherein the receiving device comprises two holding elements, a center point is defined between the two holding elements, and the at least one heat-conducting element is positioned diametrically opposite the center point.

16. The receiving device according to claim 15, wherein the receiving device comprises exactly two holding elements.

17. The receiving device according to claim 6, in which the supporting construction and the at least one heat-conducting element are manufactured by a two-component injection molding method.

18. The receiving device according to claim 17, wherein the at least one heat-conducting element is extrusion coated by the supporting construction.

* * * * *